No. 780,025. PATENTED JAN. 17, 1905.
E. A. CONYERS.
SUPPORTING FRAME FOR USE WITH SLIPPER BED PANS.
APPLICATION FILED JULY 14, 1903.

WITNESSES

INVENTOR
Evelyn Augusta Conyers
BY
ATTORNEYS

No. 780,025. Patented January 17, 1905.

UNITED STATES PATENT OFFICE.

EVELYN AUGUSTA CONYERS, OF MELBOURNE, VICTORIA, AUSTRALIA.

SUPPORTING-FRAME FOR USE WITH SLIPPER BED-PANS.

SPECIFICATION forming part of Letters Patent No. 780,025, dated January 17, 1905.

Application filed July 14, 1903. Serial No. 165,507.

*To all whom it may concern:*

Be it known that I, EVELYN AUGUSTA CONYERS, a subject of the King of Great Britain, residing at 25 Flinders Lane, in the city of Melbourne, in the county of Bourke, in the State of Victoria, in the Commonwealth of Australia, have invented a certain new and useful Improved Supporting-Frame for Use with Slipper Bed-Pans, of which the following is a specification.

My invention relates to a light frame, preferably formed of steel, and has for its object the support and relief of invalids and sick persons when using a bed-pan.

In order that my invention may be clearly rendered, reference may be had to the accompanying sheet of drawings, in which—

Figure 1:
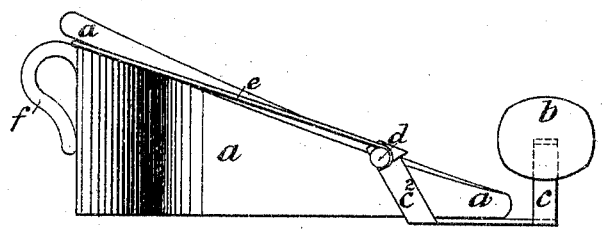
Figure 2:
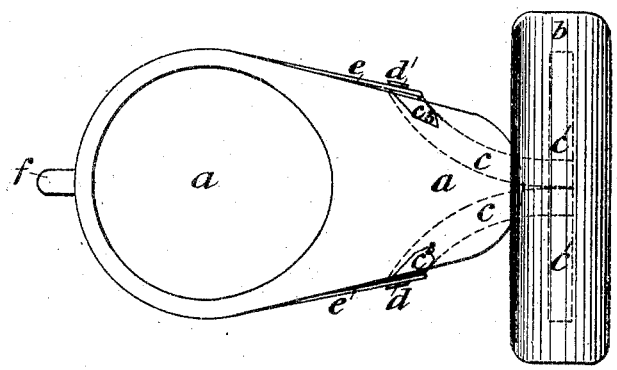

Figure 1 is a side elevation of the supporting-frame, showing end of cushion $b$ with bed-pan $a$ in position. Fig. 2 is a plan of the apparatus.

Similar letters of reference are used to indicate like parts in both views.

In constructing a supporting-frame according to my invention I employ pieces of flat steel $c$, $c'$, $c^2$, and $c^3$, as shown in Figs. 1 and 2. Two pieces, either curved or straight, as $c\ c$, pass under bottom of pan $a$, the ends of said pieces being bent upward, as at $c^2$, Fig. 1, by the sides of pan $a$ and turned over the upper edges of said pan, where they form clips $c^3$, Fig. 2, securing frame to pan. The other ends of said pieces (marked $c$) are carried outward and bent upward. They are secured to the horizontal bar $c'$, on which the cushion $b$ is formed. $e$ is a strong steel wire, one end of which is hooked over the side button $d$, then passed around the circular end of pan $a$ between its rim and handle $f$ to the button $d'$ on the other side of pan, over which the end is also hooked, thus completing the attachment between said pan and said frame.

In using my said invention the patient is raised from the bed, the pan and frame are together slipped under the patient's body, the cushioned end being foremost.

Having now described my invention, what I claim as new, and desire to secure by Letters Patent, is—

1. In combination in a bed-pan, a support adjacent one end thereof, a frame secured to said support, comprising arms embracing the sides of the pan and a spring encircling the pan and having its ends secured to the arms.

2. In combination in a bed-pan, a support adjacent one end thereof, a frame having a bent portion, said bent portion holding the support, said frame extending under the pan to each side of the same, a second bent portion extending up along each side of the pan, clips on said second bent portions extending over the top of the pan, buttons on the bent portions and a spring encircling the pan and having its ends secured to said buttons.

In witness whereof I have hereunto set my hand in presence of two witnesses.

EVELYN AUGUSTA CONYERS.

Witnesses:
  WILLIAM HENRY CUBLEY,
  WILLIAM CONYERS.